(12) United States Patent
Ko et al.

(10) Patent No.: US 10,291,041 B2
(45) Date of Patent: May 14, 2019

(54) POWER SUPPLY SYSTEM HAVING LITHIUM BATTERY

(71) Applicant: SAMSUNG ELECTRONICS CO., LTD., Suwon-si, Gyeonggi-Do (KR)

(72) Inventors: Byoungchul Ko, Osan-si (KR); Sungki Seo, Hwaseong-si (KR); Yongmun Yoon, Suwon-si (KR); Kyutae Kim, Pohang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 319 days.

(21) Appl. No.: 15/279,627

(22) Filed: Sep. 29, 2016

(65) Prior Publication Data

US 2017/0163055 A1 Jun. 8, 2017

(30) Foreign Application Priority Data

Dec. 2, 2015 (KR) .................. 10-2015-0170761

(51) Int. Cl.
*H02J 9/06* (2006.01)
*H02J 7/00* (2006.01)
*H01M 10/0525* (2010.01)
*H01M 10/42* (2006.01)

(52) U.S. Cl.
CPC ........ *H02J 7/0026* (2013.01); *H01M 10/0525* (2013.01); *H02J 9/062* (2013.01); *H01M 2010/4271* (2013.01); *H01M 2220/10* (2013.01); *Y02E 60/122* (2013.01)

(58) Field of Classification Search
CPC ... H02J 9/06; H02J 9/061; H02J 9/062; Y10T 307/625
See application file for complete search history.

(56) References Cited

U.S. PATENT DOCUMENTS

| 5,260,605 | A | * | 11/1993 | Barfield | ............... | H02J 9/061 |
| | | | | | | 307/127 |
| 6,445,088 | B1 | * | 9/2002 | Spitaels | ............... | H02J 9/061 |
| | | | | | | 307/66 |
| 6,476,519 | B1 | * | 11/2002 | Weiner | ............... | H02J 9/002 |
| | | | | | | 307/23 |
| 7,259,475 | B2 | | 8/2007 | Hong et al. | | |
| 9,300,171 | B2 | * | 3/2016 | Moth | ............... | H02J 9/062 |
| 9,806,560 | B2 | * | 10/2017 | Navarro | ............... | H02J 9/06 |

(Continued)

FOREIGN PATENT DOCUMENTS

| JP | 3598799 | | 9/2004 |
| KR | 0509263 | B1 | 8/2005 |

(Continued)

*Primary Examiner* — Fritz M Fleming
(74) *Attorney, Agent, or Firm* — Volentine, Whitt & Francos, PLLC

(57) ABSTRACT

A power supply system has a lithium battery. The system includes an uninterruptible power supply (UPS) connected between a commercial power source and a device of a first type. A lithium battery is connected to the uninterruptible power supply. A voltage drop protector (VDP) is connected to the lithium battery and connected between the commercial power source and a device of a second type. Tolerable error thresholds for a voltage and frequency required for the device of the first type are smaller than tolerable error thresholds for voltage and frequency required for the device of the second type.

16 Claims, 9 Drawing Sheets

(56) References Cited

U.S. PATENT DOCUMENTS

| | | | |
|---|---|---|---|
| 2009/0021079 A1* | 1/2009 | Johnson, Jr. | H02J 9/062 307/68 |
| 2015/0021991 A1 | 1/2015 | Wood et al. | |
| 2015/0130277 A1 | 5/2015 | Ballantine et al. | |
| 2015/0171666 A1 | 6/2015 | Yeon et al. | |

FOREIGN PATENT DOCUMENTS

| | | |
|---|---|---|
| KR | 0701886 B1 | 3/2007 |
| KR | 1254982 B1 | 4/2013 |
| KR | 12J82863 B1 | 7/2013 |
| KR | 1343953 B1 | 12/2013 |
| KR | 20140075472 A | 6/2014 |
| KR | 20150033882 A | 4/2015 |

* cited by examiner

POWER SUPPLY SYSTEM HAVING LITHIUM BATTERY

CROSS-REFERENCE TO RELATED APPLICATION

This application claims priority under 35 U.S.C. § 119 to Korean Patent Application No. 10-2015-0170761, filed on Dec. 2, 2015 in the Korean Intellectual Property Office, the disclosure of which is hereby incorporated by reference in its entirety.

BACKGROUND

Field of the Disclosure

The present disclosure relates to a power supply system having a lithium battery.

Background Information

Research has been performed on techniques for continuously supplying stable power in response to failure of a commercial power source. A power supply using a lead storage battery as an energy source has problems such as low energy density, a short lifespan, and low power. Alternatively, a power supply using an electric double layer condenser as an energy source is difficult to maintain, and causes loss due to a leakage current.

SUMMARY

The present disclosure describes an efficient power supply system.

The technical objectives of the present disclosure are not limited to the disclosure herein; rather, other objectives may become apparent to those of ordinary skill in the art based on the following descriptions.

In accordance with an aspect of the present disclosure, a power supply system is provided. The system includes an uninterruptible power supply (UPS) connected between a commercial power source and a device of a first type. A lithium battery is connected to the uninterruptible power supply. A voltage drop protector (VDP) is connected to the lithium battery and connected between the commercial power source and a device of a second type. Tolerable error thresholds for a voltage and frequency required for the device of the first type are smaller than tolerable error thresholds for the device of the second type.

The uninterruptible power supply and the voltage drop protector may be disposed near the lithium battery. A first line may be formed between the uninterruptible power supply and the lithium battery. A second line may be formed between the voltage drop protector and the lithium battery. A length of the first line and a length of the second line may have a difference of less than 10%.

The length of the first line may be substantially the same as the length of the second line.

The lithium battery may include multiple battery cells connected to each other in series. Each of the battery cells may include a lithium ion battery or a lithium polymer battery.

A battery management system (BMS) may be installed in the lithium battery. Each of the battery cells may be electrically connected to the battery management system.

The voltage drop protector may include a thyristor, an inverter, and a voltage regulator. The inverter is connected to the device of the second type. The voltage regulator may be disposed between the inverter and the lithium battery.

The voltage drop protector may further include a timer. The timer may serve to block power supply to the device of the second type from the lithium battery after a time period has elapsed. For example, the timer may block power supply after about 1 second has elapsed after power supplied from the commercial power source is stopped or is lowered to a reference voltage (or less).

The voltage regulator may include a chopper.

The timer may be installed in the voltage regulator.

The uninterruptible power supply may include a rectifier disposed between the commercial power source and the device of the first type. An inverter may be disposed between the rectifier and the device of the first type. A chopper may be connected between the rectifier and the inverter, and connected to the lithium battery.

A charging circuit may be installed in the rectifier or the chopper, and connected to the lithium battery.

In accordance with an aspect of the present disclosure, a power supply system includes a voltage drop protector connected between a commercial power source and an electrical device. A lithium battery is connected to the voltage drop protector. Tolerable error thresholds reflective of allowable errors for a voltage and frequency required for the electrical device are the same as tolerable error thresholds for a voltage and frequency required for the commercial power source. The voltage drop protector serves to supply power to the electrical device from the lithium battery for about 1 second after power supplied from the commercial power source is stopped or is lowered to a reference voltage (or less).

The voltage drop protector may include a thyristor, an inverter, and a voltage regulator. The thyristor is disposed between the commercial power source and the electrical device. The inverter may be connected to the electrical device. The voltage regulator may be disposed between the inverter and the lithium battery.

The voltage drop protector may further include a timer. The timer may serve to block power supply to the electrical device from the lithium battery after about 1 second has elapsed after the power supplied from the commercial power source is stopped or is lowered to the reference voltage (or less).

A charging circuit may be disposed between the commercial power source and the lithium battery.

In accordance with an aspect of the present disclosure, a power supply system is provided. The system includes an uninterruptible power supply connected between a commercial power source and an electrical device. A lithium battery is connected to the uninterruptible power supply. Tolerable error thresholds for a voltage and frequency required for the electrical device are smaller than tolerable error thresholds for the commercial power source. The uninterruptible power supply serves to supply power to the electrical device from the lithium battery for about 10 minutes from a time point at which a power source supplied from the commercial power source is stopped or is lowered to a reference voltage (or less).

The uninterruptible power supply may include a rectifier disposed between the commercial power source and the electrical device. An inverter may be disposed between the rectifier and the electrical device. A chopper may be connected between the rectifier and the inverter, and connected to the lithium battery.

A charging circuit may be installed in the rectifier or the chopper and connected to the lithium battery.

The lithium battery may include multiple battery cells connected to each other in series. Each of the battery cells may include a lithium ion battery or a lithium polymer battery.

A battery management system may be installed in the lithium battery and connected to the charging circuit. Each of the battery cells may be electrically connected to the battery management system.

Details of other embodiments are included in the detailed descriptions of the drawings.

BRIEF DESCRIPTION OF THE DRAWINGS

The foregoing and other features and advantages of the present disclosures will be apparent from the more particular description of preferred embodiments of the present disclosure, as illustrated in the accompanying drawings in which like reference characters refer to the same parts throughout the different views. The drawings are not necessarily to scale. Instead, emphasis may be placed upon illustrating the principles of the present disclosure. In the drawings.

DETAILED DESCRIPTION OF THE EMBODIMENTS

Figure 1:
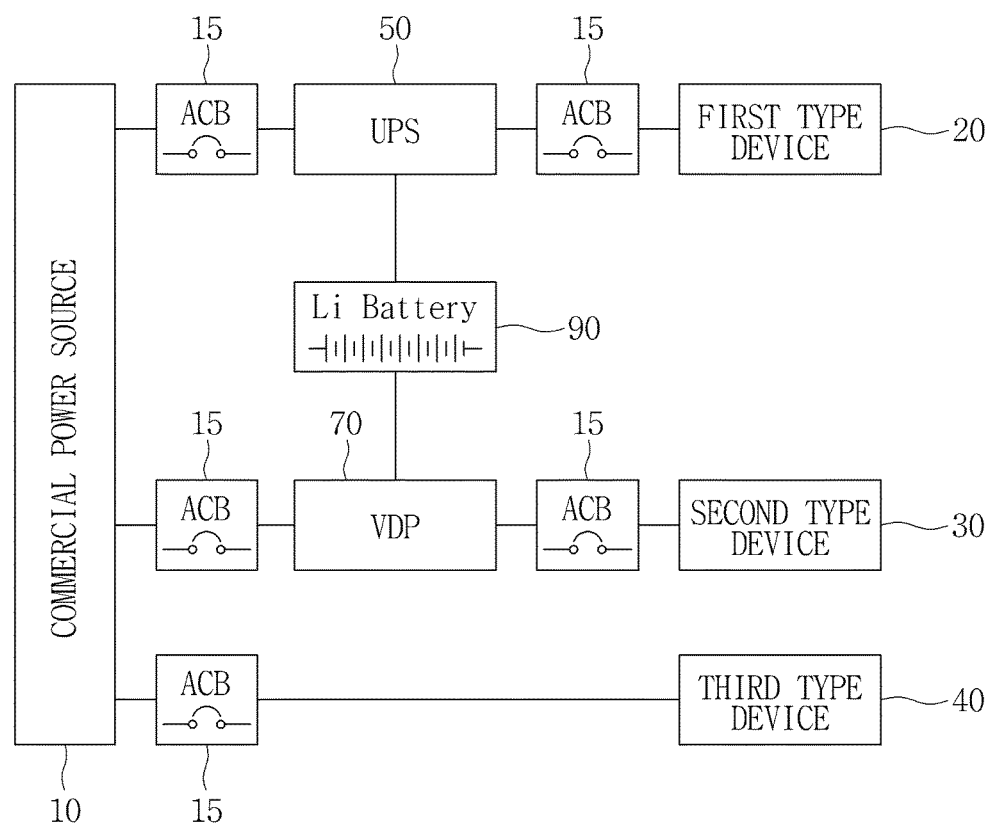
FIG. 1 is a block diagram that shows a power supply system according to an embodiment of the present disclosure.

Advantages and features of the teachings herein, and methods of practicing such teachings will be made apparent with reference to the accompanying drawings and some embodiments to be described below. The teachings herein may, however, be embodied in various different forms, and should be construed as limited, not by the embodiments set forth herein, but only by the accompanying claims. Rather, these embodiments are provided so that this disclosure is thorough and complete and fully conveys the teachings of the present disclosure to those skilled in the art.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to," or "directly coupled to" another element or layer, there are no intervening elements or layers present. Like reference numerals throughout this specification denote like elements. As used herein, the term "and/or" includes any and all combinations of one or more of the associated listed items.

Spatially relative terms, such as "below," "beneath," "lower," "above," "upper," and the like, may be used herein for ease of description in describing one element's or feature's relationship to another/other element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein may be interpreted accordingly.

Exemplary embodiments will be described with reference to cross-sectional views and/or plan views, which are ideal exemplary views. Thicknesses of layers and areas are exaggerated for effective description of the technical contents in the drawings. Forms of the embodiments may be modified by the manufacturing technology and/or tolerance. Therefore, the embodiments are not intended to be limited to illustrated specific forms, and include modifications of forms generated according to manufacturing processes. For example, an etching area illustrated at a right angle may be round or have a predetermined curvature. Therefore, areas illustrated in the drawings have overview properties, and shapes of the areas are illustrated special forms of the areas of a device, and are not intended to limit the scope of the invention(s) described herein.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

Terms such as "front side," and "back side" may be used in a relative sense herein to facilitate easy understanding of the present disclosure. Accordingly, "front side," and "back side" may not refer to any specific direction, location, or component, and may be used interchangeably. For example, "front side" may be interpreted as "back side" and vice versa. Also, "front side" may be expressed as "first side," and "back side" may be expressed as "second side," and vice versa. However, "front side," and "back side" cannot be used interchangeably in the same embodiment.

The term "near" may mean that one among two or more components is located within relatively close proximity of a certain other component. For example, it should be understood that when a first end is near a first side, the first end may be closer to the first side than a second end, or the first end may be closer to the first side than to a second side. The term "near" as used herein may also mean, for example, adjacent, or without any intermediate tangible element, or in the same (fully or partially) enclosed space, or within the same device or closed system.

FIG. 1 is a block diagram for describing a power supply system according to an embodiment of the present disclosure.

Referring to FIG. 1, the power supply system according to the embodiment of the present disclosure may include a commercial power source 10, circuit breakers 15, a device of a first type 20, a device of a second type 30, a device of a third type 40, an uninterruptible power supply (UPS) 50, a voltage drop protector (VDP) 70, and a lithium battery 90. An uninterruptible power supply (UPS) may be a device or component that provides a power supply for at least a short time when another, primary, power source is lost. An uninterruptible power supply may provide protection from power surges.

The commercial power source 10 may, for example, be connected to a power plant outside a factory, or an electric generator inside the factory. The commercial power source 10 may include multistage transformers. The circuit breaker 15 may include an air circuit breaker (ACB).

The device of the first type 20 may be a device that requires a power source having an error at a lower level than allowable errors of a voltage and frequency of a power source supplied from the commercial power source 10. For example, the device of the first type 20 may be a device that requires a constant voltage constant frequency (CVCF) power source. Each of the device of the second type 30 and the device of the third type 40 may be devices that require a power source having an error at the same level as the allowable errors of the voltage and frequency of the power source supplied from the commercial power source 10. For example, the allowable errors of the voltage and frequency of the power source supplied from the commercial power source 10 may be 10%. The device of the first type 20 may be a device that requires a power source with voltage and frequency having errors at a lower level than errors acceptable to the device of the second type 30 and acceptable to the device of the third type 40.

The uninterruptible power supply 50 may be disposed between the commercial power source 10 and the device of the first type 20. The circuit breaker 15 may be interposed between the commercial power source 10 and the uninterruptible power supply 50. The circuit breaker 15 may be interposed between the uninterruptible power supply 50 and the device of the first type 20. The uninterruptible power supply 50 may be connected to the lithium battery 90. The uninterruptible power supply 50 may serve to supply power to the device of the first type 20 using the lithium battery 90 for a time such as about 10 minutes when the power supplied from the commercial power source 10 is stopped or is lowered to a reference voltage (or less).

The voltage drop protector 70 may be disposed between the commercial power source 10 and the device of the second type 30. The circuit breaker 15 may be interposed between the commercial power source 10 and the voltage drop protector 70. The circuit breaker 15 may be interposed between the voltage drop protector 70 and the device of the second type 30. The voltage drop protector 70 may be connected to the lithium battery 90. The voltage drop protector 70 may serve to supply power to the device of the second type 30 using the lithium battery 90 for about 1 second when the power supplied from the commercial power source 10 is stopped or is lowered to the reference voltage (or less).

The lithium battery 90 may be connected to the uninterruptible power supply 50 and the voltage drop protector 70. The circuit breaker 15 may be interposed between the commercial power source 10 and the device of the third type 40.

In an embodiment, the uninterruptible power supply 50 may be an on-line power supply. The voltage drop protector 70 may be an off-line power supply.

Figure 2:
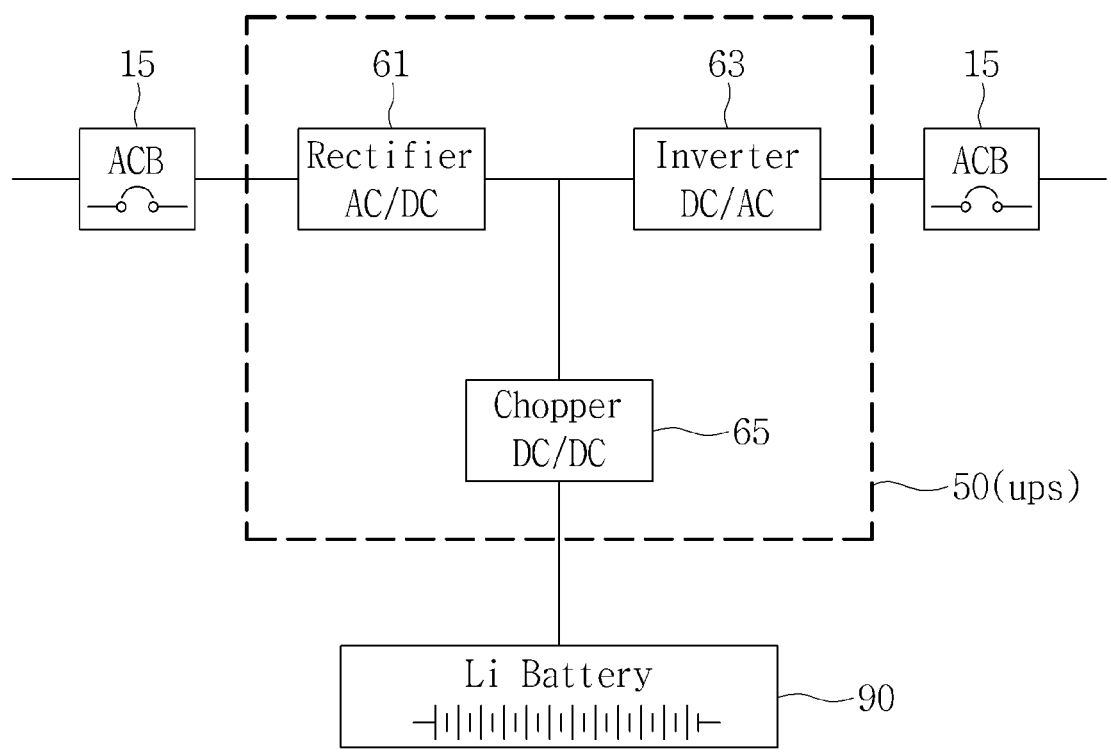
FIGS. 2 and 3 are block diagrams illustrating selected portions of FIG. 1 in detail.
Figure 3:
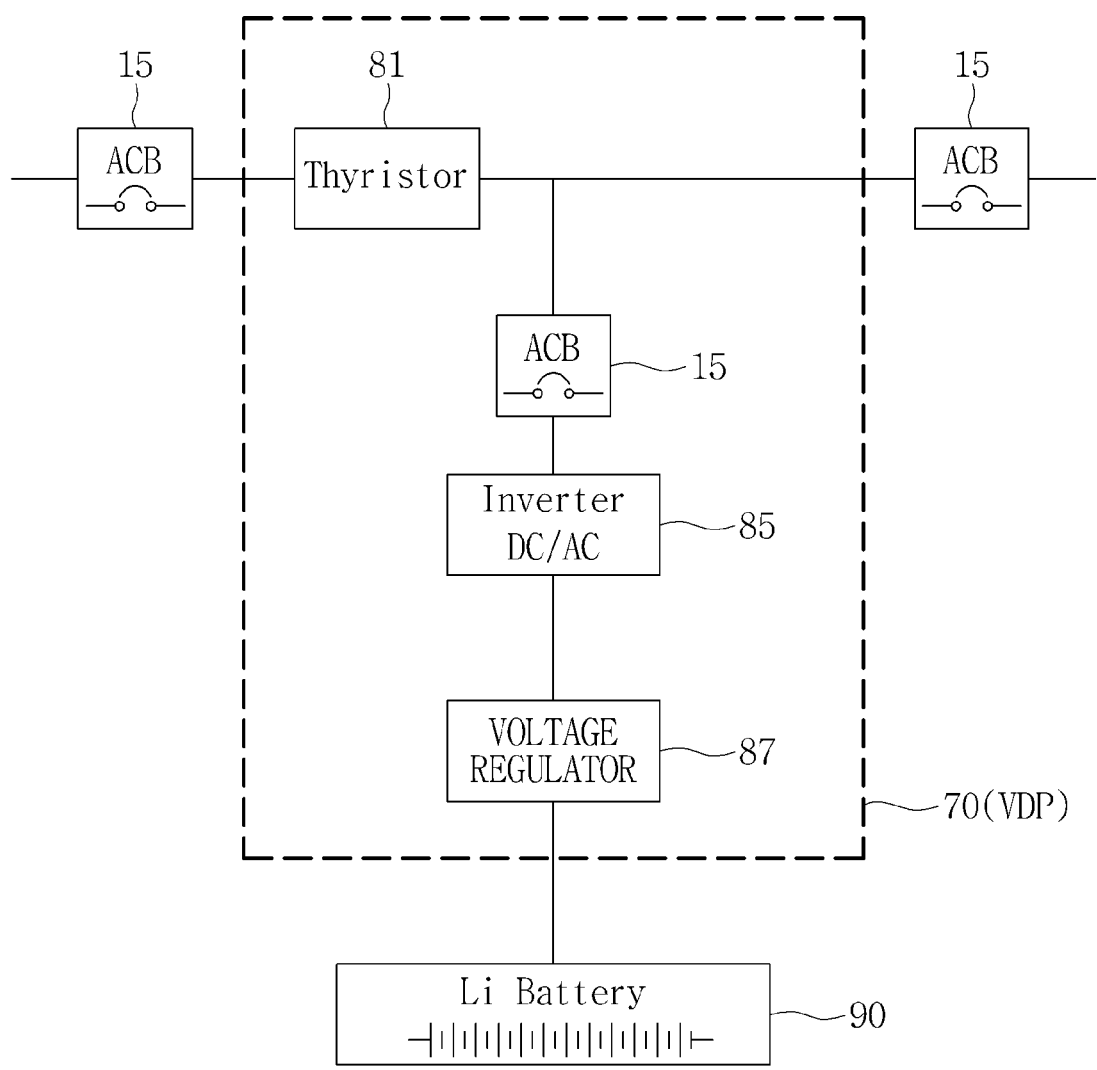

FIGS. 2 and 3 are block diagrams illustrating some portions of FIG. 1 in detail.

Referring to FIGS. 1 and 2, the uninterruptible power supply 50 may include a rectifier 61, a first inverter 63, and a chopper 65.

The rectifier 61 may be connected to the first inverter 63. The chopper 65 may be connected between the rectifier 61 and the first inverter 63. The lithium battery 90 may be connected to the chopper 65. The rectifier 61 may be connected to the commercial power source 10. The first inverter 63 may be connected to the device of the first type 20. The rectifier 61 may serve to convert alternating-current (AC) power supplied from the commercial power source 10 to direct-current (DC) power. The first inverter 63 may serve to convert DC power supplied from the rectifier 61 to AC power. The chopper 65 may serve to regulate DC power supplied from the lithium battery 90 at regular time intervals.

Referring to FIGS. 1 and 3, the voltage drop protector 70 may include a thyristor 81, a second inverter 85, and a voltage regulator 87.

The thyristor 81 may be interposed between the commercial power source 10 and the device of the second type 30. The thyristor 81 may include a silicon controlled rectifier (SCR). The thyristor 81 may serve as a switching device. The second inverter 85 may be connected between the thyristor 81 and the device of the second type 30. The second inverter 85 may serve to convert DC power supplied from the voltage regulator 87 to AC power. Multiple circuit breakers 15 may be interposed between the second inverter 85 and the device of the second type 30. The voltage regulator 87 may be disposed between the second inverter 85 and the lithium battery 90. The voltage regulator 87 may include a chopper. The voltage regulator 87 may serve to raise or reduce a voltage of the DC power supplied from the lithium battery 90. The voltage regulator 87 may serve to regulate the DC power supplied from the lithium battery 90 at regular time intervals.

Figure 4:
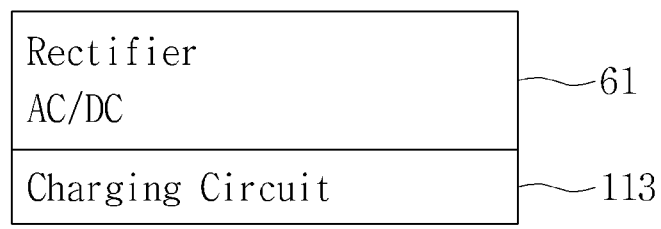
FIGS. 4 and 5 are block diagrams illustrating selected portions of FIG. 2 in detail.
Figure 5:
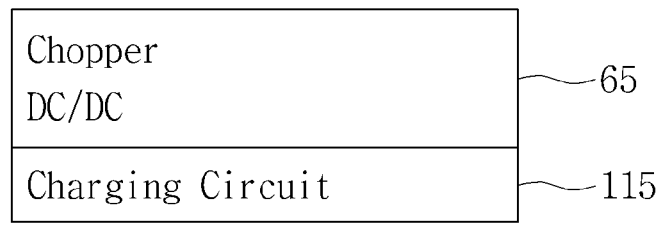

FIGS. 4 and 5 are block diagrams illustrating some portions of FIG. 2 in detail.

Referring to FIGS. 2 and 4, a first charging circuit 113 may be installed at a side of the rectifier 61. The first charging circuit 113 may serve to charge the lithium battery 90. The first charging circuit 113 may be omitted.

Referring to FIGS. 2 and 5, a second charging circuit 115 may be installed at a side of the chopper 65. The second charging circuit 115 may serve to charge the lithium battery 90. The second charging circuit 115 may be omitted.

Figure 6:
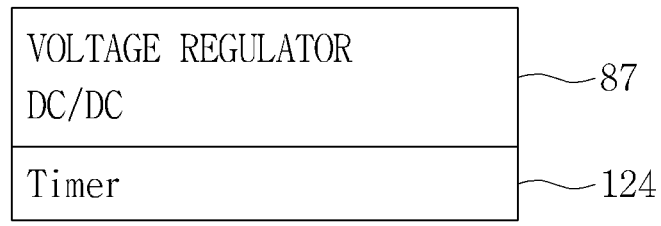
FIG. 6 is a block diagram illustrating several components of FIG. 3 in detail.

FIG. 6 is a block diagram illustrating some portions of FIG. 3 in detail.

Referring to FIGS. 3 and 6, a timer 124 may be installed at a side of the voltage regulator 87. The timer 124 may serve to block power supply to the device of the second type 30 from the lithium battery 90 after about 1 second has elapsed from a time point at which the power supplied from the commercial power source 10 is stopped or is lowered to the reference voltage (or less). The voltage regulator 87 may serve to raise or reduce a voltage of the DC power supplied from the lithium battery 90. The voltage regulator 87 may serve to regulate the DC power supplied from the lithium battery 90 at regular time intervals.

In an embodiment, the timer 124 may be installed at the second inverter 85 or the circuit breaker 15. The timer 124 may be omitted.

Figure 7:
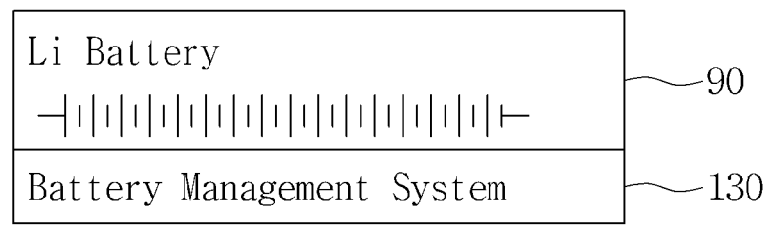
FIG. 7 is a block diagram illustrating several components of FIG. 1 in detail.

FIG. 7 is a block diagram illustrating some portions of FIG. 1 in detail.

Referring to FIG. 7, a battery management system (BMS) 130 may be installed at a side of the lithium battery 90. The battery management system 130 may serve to monitor and control a state of the lithium battery 90.

In an embodiment, the battery management system 130 may be disposed outside the lithium battery 90.

Figure 8:
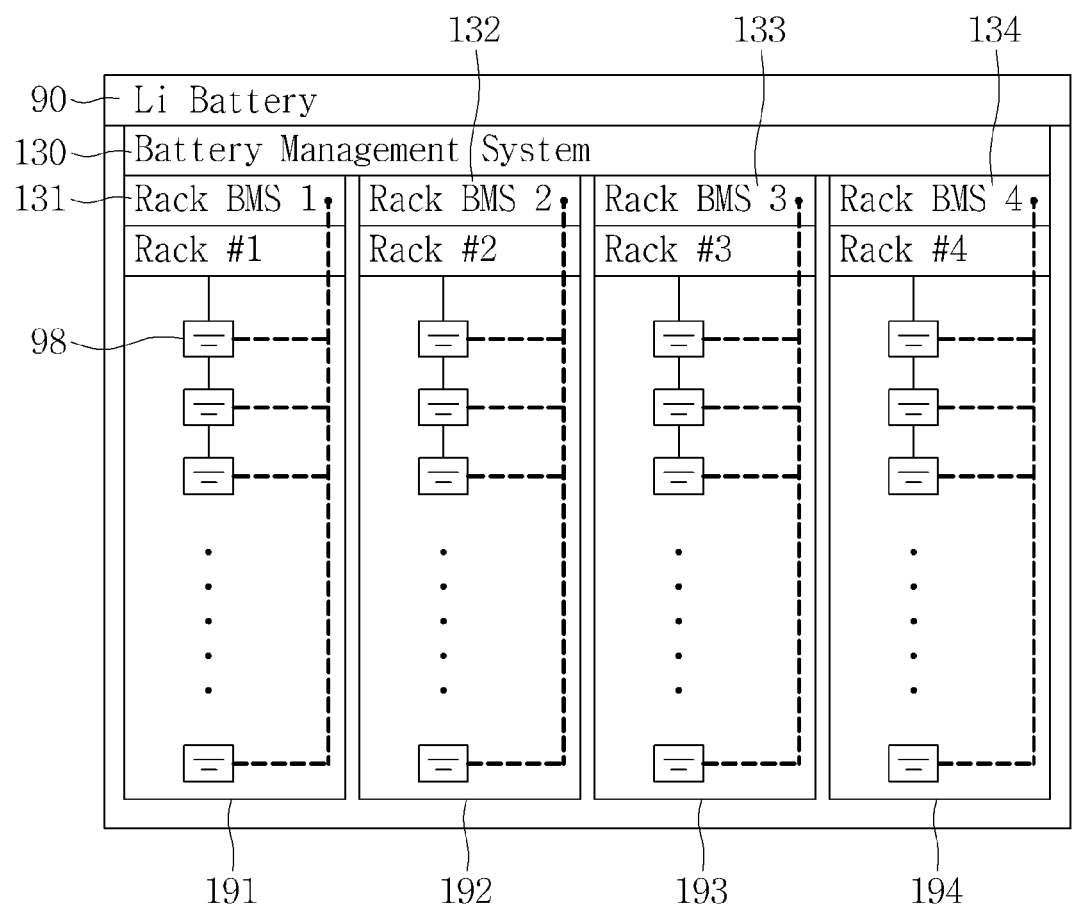
FIG. 8 is a block diagram illustrating some portions of FIG. 7 in detail.

FIG. 8 is a block diagram illustrating some portions of FIG. 7 in detail.

Referring to FIG. 8, the lithium battery 90 may include multiple racks 191, 192, 193, and 194. Each of the racks 191, 192, 193, and 194 may include multiple battery cells 98. The battery management system 130 may be installed in the lithium battery 90. The battery management system 130 may include multiple rack battery management systems 131, 132, 133, and 134.

Each of the battery cells 98 may include a lithium ion battery or a lithium polymer battery. Each of the battery cells 98 may be electrically connected to one selected from the rack BMSs 131, 132, 133, and 134. For example, each of the racks 191, 192, 193, and 194 may include 136 battery cells 98 connected to each other in series. Each of the rack BMSs 131, 132, 133, and 134 may serve to monitor and control a voltage, current, temperature, and impedance of each of the battery cells 98.

Referring again to FIGS. 1 to 8, the power supplied from the commercial power source 10 may be supplied to the device of the first type 20 via the uninterruptible power supply 50. For example, the power supplied from the commercial power source 10 may pass through the rectifier 61 and the first inverter 63 sequentially to be supplied to the device of the first type 20. The rectifier 61 and the first inverter 63 may serve to control the power supplied from the commercial power source 10 as CVCF power source. The device of the first type 20 may be a device that requires a power source having an error at a lower level than the allowable errors of the voltage and frequency of the power supplied from the commercial power source 10. The device of the first type 20 may be a device that requires a power source having an error at a lower level than that of a power source required for the device of the second type 30 and the device of the third type 40.

The first charging circuit 113 and the second charging circuit 115 may serve to charge the lithium battery 90. The battery management system 130 may serve to control the lithium battery 90. The battery management system 130 may serve to charge the lithium battery 90 in connection with the first charging circuit 113 and/or the second charging circuit 115. For example, the lithium battery 90 may supply DC power of about 560 V.

When the power supplied from the commercial power source 10 is lowered to the reference voltage or less or is stopped, the uninterruptible power supply 50 may serve to supply power to the device of the first type 20 for about 10 minutes using the lithium battery 90 as an energy source. For example, the DC power of the lithium battery 90 may be converted to AC power while passing through the chopper 65 and the first inverter 63 sequentially to be supplied to the device of the first type 20.

The power supplied from the commercial power source 10 may be supplied to the device of the second type 30 via the voltage drop protector 70. The device of the second type 30 may be a device that requires a power source having an error at the same level as the allowable errors of the voltage and frequency of the power supplied from the commercial power source 10. The allowable errors of the voltage and frequency of the commercial power source 10 may be 10%. For example, the power supplied from the commercial power source 10 may be supplied to the device of the second type 30 via the thyristor 81.

When the power supplied from the commercial power source 10 is lowered to the reference voltage or less or is stopped, the voltage drop protector 70 may serve to supply power to the device of the second type 30 for about 1 second using the lithium battery 90. For example, the DC power of the lithium battery 90 may be converted to AC power while passing through the voltage regulator 87 and the second inverter 85 sequentially to be supplied to the device of the second type 30. The voltage regulator 87 may serve to raise a voltage of the DC power supplied from the lithium battery 90. For example, a voltage of DC power of about 560 V supplied from the lithium battery 90 may be raised to DC power of about 750 V while passing through the voltage regulator 87 to be supplied to the second inverter 85.

The timer 124 may serve to block power supply to the device of the second type 30 from the lithium battery 90 after about 1 second has elapsed from a time point at which the power supplied from the commercial power source 10 is stopped or is lowered to the reference voltage (or less).

Figure 9:
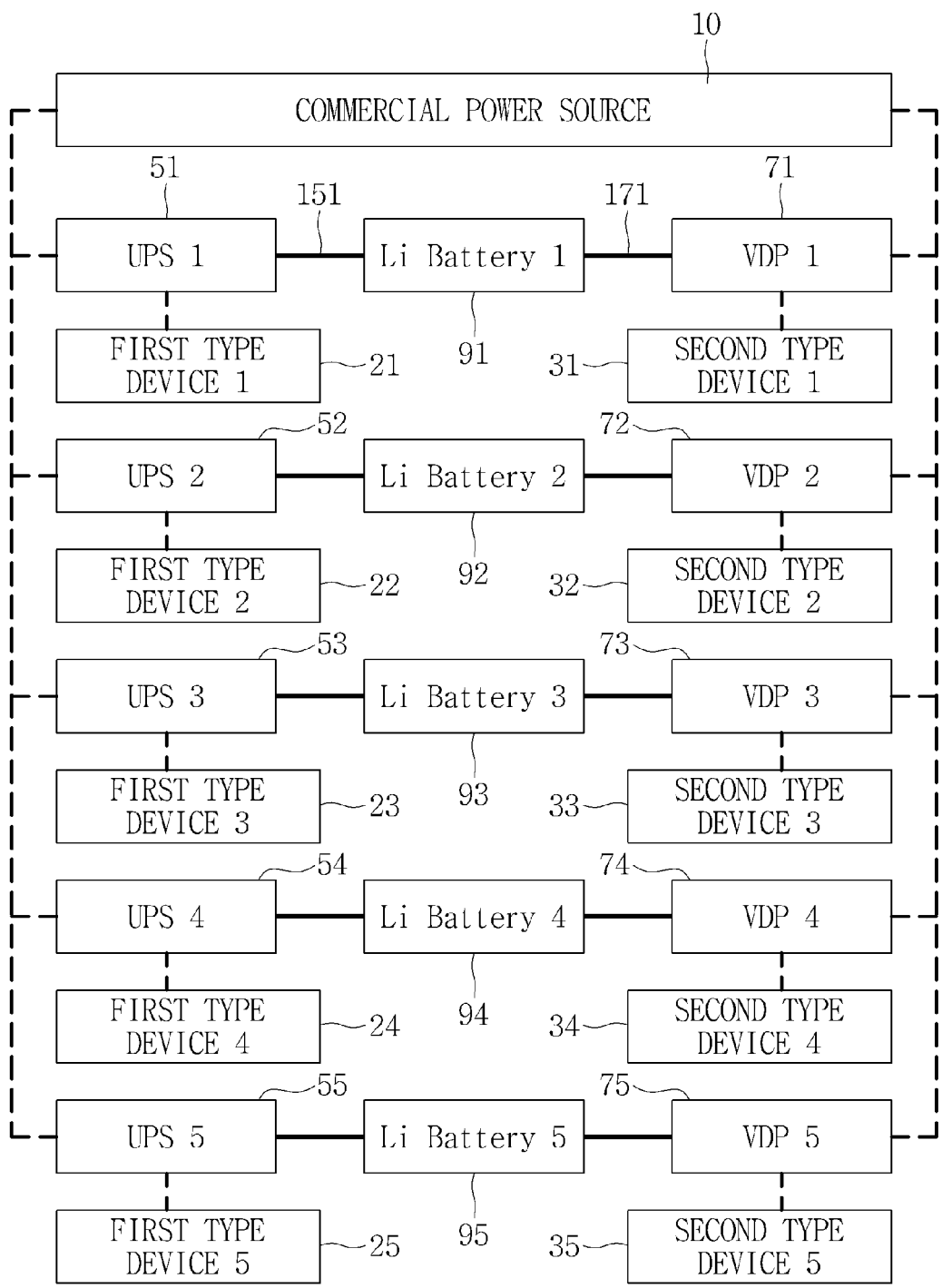
FIG. 9 is a block diagram for describing a power supply system according to an embodiment of the present disclosure.

FIG. 9 is a block diagram for describing a power supply system according to an embodiment of the present disclosure.

Referring to FIG. 9, multiple devices of a first type 21, 22, 23, 24, and 25 and device of a second type 31, 32, 33, 34, and 35 may be disposed to be electrically connected to a commercial power source 10. Uninterruptible power supplies 51, 52, 53, 54, and 55 may be disposed between the commercial power source 10 and the devices of the first type 21, 22, 23, 24, and 25. Voltage drop protectors 71, 72, 73, 74, and 75 may be disposed between the commercial power source 10 and the devices of the second type 31, 32, 33, 34, and 35. Lithium batteries 91, 92, 93, 94, and 95 may be disposed between the uninterruptible power supplies 51, 52, 53, 54, and 55 and the voltage drop protectors 71, 72, 73, 74, and 75.

Each of the lithium batteries 91, 92, 93, 94, and 95 may be electrically connected to one selected from the uninterruptible power supplies 51, 52, 53, 54, and 55 and one selected from the voltage drop protectors 71, 72, 73, 74, and 75. A first line 151 may be provided between each of the lithium batteries 91, 92, 93, 94, and 95 and one selected from the uninterruptible power supplies 51, 52, 53, 54, and 55. A second line 171 may be provided between each of the lithium batteries 91, 92, 93, 94, and 95 and one selected from the voltage drop protectors 71, 72, 73, 74, and 75. A length of the first line 151 and a length of the second line 171 may have a difference of less than 10%. For example, the first line 151 may be formed to have substantially the same length as the second line 171. Line impedance of the first line 151 may be substantially the same as that of the second line 171.

The lithium batteries 91, 92, 93, 94, and 95, the uninterruptible power supplies 51, 52, 53, 54, and 55, and the voltage drop protectors 71, 72, 73, 74, and 75 may be closely disposed. The length of the first line 151 and the length of the second line 171 may be minimized The line impedance of the first line 151 and the line impedance of the second line 171 may be significantly reduced compared to a conventional method.

For example, the lithium batteries 91, 92, 93, 94, and 95 may include a first lithium battery 91, a second lithium battery 92, a third lithium battery 93, a fourth lithium battery 94, and a fifth lithium battery 95. The first lithium battery 91 may be connected to one (e.g., the uninterruptible power supply 51) selected from the uninterruptible power supplies 51, 52, 53, 54, and 55 and one (e.g., the voltage drop protector 71) selected from the voltage drop protectors 71, 72, 73, 74, and 75. The first line 151 may be formed between one (e.g., the uninterruptible power supply 51) selected from the uninterruptible power supplies 51, 52, 53, 54, and 55 and the first lithium battery 91. The second line 171 may be formed between one (e.g., the voltage drop protector 71) selected from the voltage drop protectors 71, 72, 73, 74, and 75 and the first lithium battery 91.

One (e.g., the uninterruptible power supply 51) selected from the uninterruptible power supplies 51, 52, 53, 54, and 55 and one (e.g., the voltage drop protector 71) selected from the voltage drop protectors 71, 72, 73, 74, and 75 may be disposed near the first lithium battery 91. The length of the first line 151 and the length of the second line 171 may be minimized The line impedance of the first line 151 and the line impedance of the second line 171 may be minimized The length of the first line 151 and the length of the second line 171 may have a difference of less than 10%. The first line 151 may be formed to have substantially the same length as the second line 171. The line impedance of the first line 151 may be substantially the same as the line impedance of the second line 171.

Figure 10:
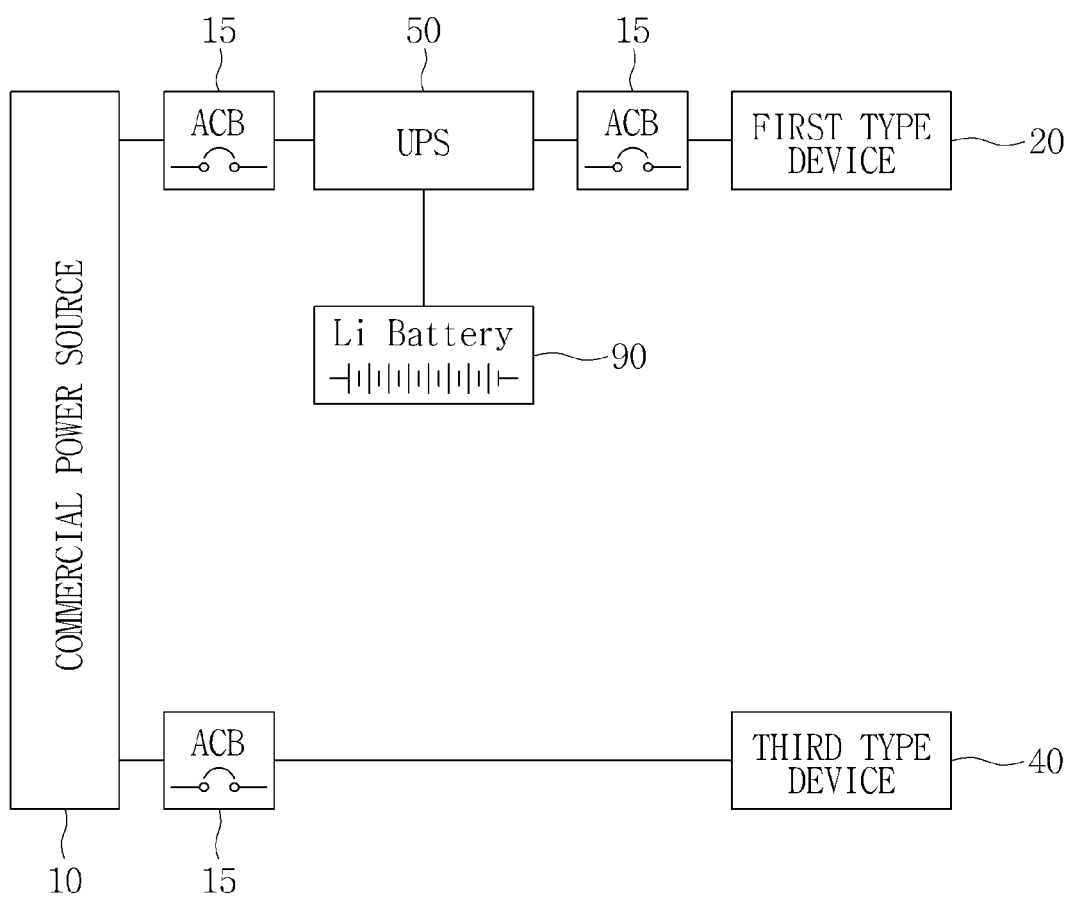
FIGS. 10, 11 and 12 are block diagrams for describing a power supply system according to embodiments of the present disclosure.
Figure 12:
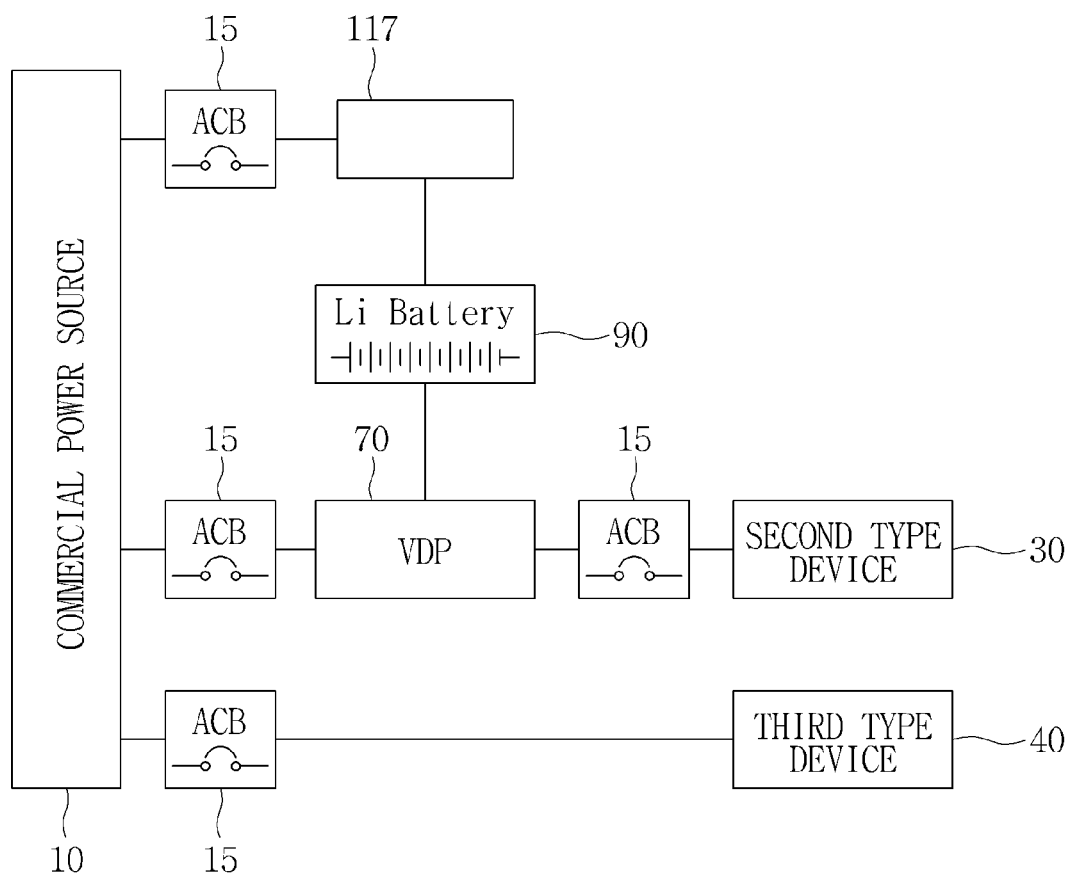

FIGS. 10 and 12 are block diagrams for describing a power supply system according to embodiments of the present disclosure.

Referring to FIG. 10, a power supply system according to an embodiment of the present disclosure may include a commercial power source 10, circuit breakers 15, a device of a first type 20, a device of a third type 40, an uninterruptible power supply 50, and a lithium battery 90.

Figure 11:
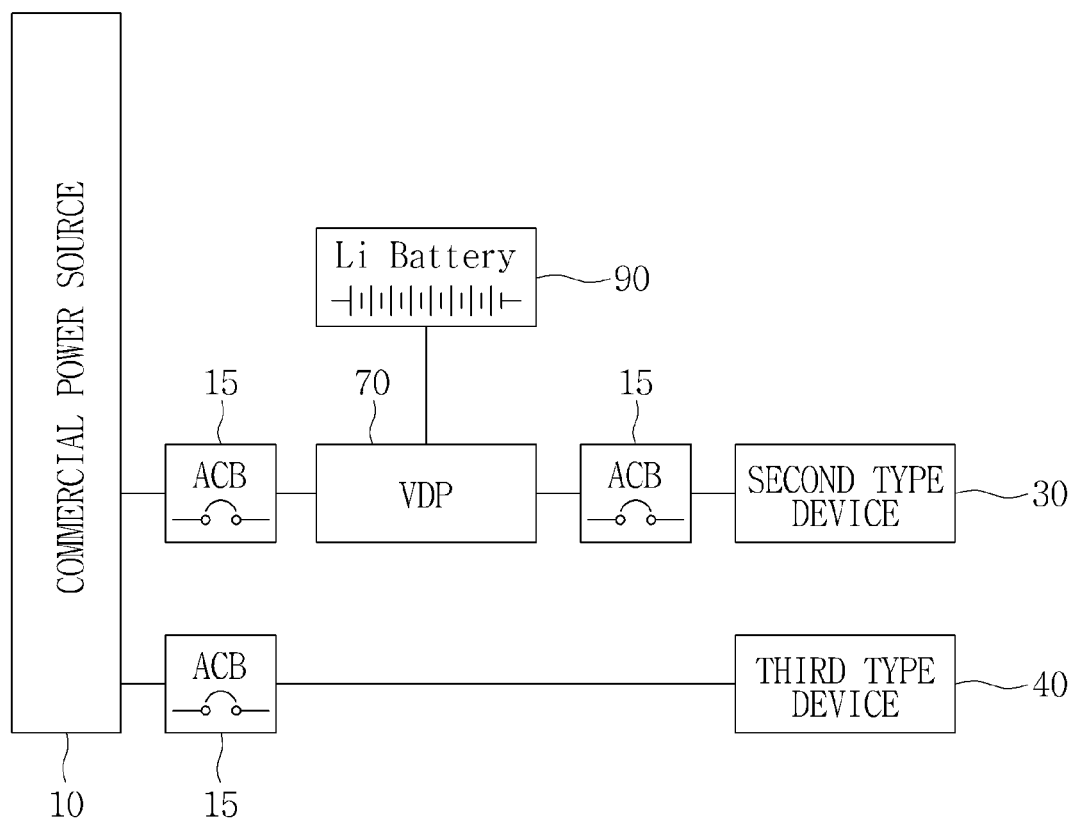

Referring to FIG. 11, a power supply system according to an embodiment of the present disclosure may include a commercial power source 10, circuit breakers 15, a device of a second type 30, a device of a third type 40, a voltage drop protector 70, and a lithium battery 90.

Referring to FIG. 12, a power supply system according to an embodiment of the present disclosure may include a commercial power source 10, circuit breakers 15, a device of a second type 30, a device of a third type 40, a voltage drop protector 70, a third charging circuit 117, and a lithium battery 90.

The third charging circuit 117 may serve to charge the lithium battery 90.

According to the embodiments of the inventive concept, an uninterruptible power supply and a voltage drop protector which are connected to a lithium battery are provided. The lithium battery has a high output characteristic and high energy density. A power source may be supplied to two systems, that is, the uninterruptible power supply and the VDP, using a single energy source, that is, the lithium battery. Therefore, an efficient power supply system can be implemented.

Although a few embodiments have been described with reference to the accompanying drawings, those skilled in the art will readily appreciate that many modifications are possible in embodiments without departing from the scope of the present disclosure and without changing essential features. Therefore, the above-described embodiments should be considered in a descriptive sense only and not for purposes of limitation.

What is claimed is:

1. A power supply system, comprising:
an uninterruptible power supply (UPS) connected between a commercial power source and a device of a first type;
a lithium battery connected to the uninterruptible power supply; and
a voltage drop protector (VDP) connected to the lithium battery and connected between the commercial power source and a device of a second type,
wherein tolerable error thresholds for a voltage and frequency required for the device of the first type are smaller than tolerable error thresholds for a voltage and frequency for the device of the second type.

2. The system of claim 1, wherein:
the uninterruptible power supply and the voltage drop protector are disposed near the lithium battery;
a first line is formed between the uninterruptible power supply and the lithium battery, and a second line is formed between the voltage drop protector and the lithium battery; and
a length of the first line and a length of the second line have a difference of less than 10%.

3. The system of claim 2, wherein the length of the first line is substantially the same as the length of the second line.

4. The system of claim 1, wherein the lithium battery includes a plurality of battery cells connected to each other in series, and
each of the battery cells has a lithium ion battery or a lithium polymer battery.

5. The system of claim 4, further comprising a battery management system (BMS) installed in the lithium battery, wherein each of the battery cells is electrically connected to the battery management system.

6. The system of claim 1, wherein the voltage drop protector includes:
a thyristor disposed between the commercial power source and the device of the second type;
an inverter connected to the device of the second type; and
a voltage regulator disposed between the inverter and the lithium battery.

7. The system of claim 6, wherein the voltage drop protector further includes a timer,
wherein the timer serves to block power supply to the device of the second type from the lithium battery after approximately 1 second has elapsed from a time point at which power supplied from the commercial power source is stopped or is lowered to a reference voltage or lower.

8. The system of claim 7, wherein the voltage regulator includes a chopper.

9. The system of claim 7, wherein the timer is installed in the voltage regulator.

10. The system of claim 1, wherein the uninterruptible power supply includes:
a rectifier disposed between the commercial power source and the device of the first type;
an inverter disposed between the rectifier and the device of the first type; and
a chopper connected between the rectifier and the inverter and connected to the lithium battery.

11. The system of claim 10, further comprising a charging circuit installed in the rectifier or the chopper and connected to the lithium battery.

12. A voltage drop protector in a power supply system, comprising:

a thyristor disposed between a commercial power source and a device of a first type;
an inverter connected to the device of the first type; and
a voltage regulator disposed between the inverter and a lithium battery,
wherein the voltage drop protector is connected to the lithium battery and between the commercial power source and the device of the first type,
wherein the lithium battery is connected to an uninterruptible power supply that is between the commercial power source and a device of a second type; and
wherein tolerable error thresholds for voltage and frequency for the device of the second type are smaller than tolerable error thresholds for voltage and frequency for the device of the first type.

13. The voltage drop protector of claim 12,
wherein a first line is formed between the voltage drop protector and the lithium battery;
wherein a second line is formed between the uninterruptible power supply and the lithium battery and
wherein a length of the second line is within 10% of a length of the first line.

14. The voltage drop protector of claim 12, further comprising:
a timer that serves to block power supply to the device of the first type from the lithium battery after approximately 1 second has elapsed from a time point at which power supplied from the commercial power source is stopped or is lowered to a reference voltage or less.

15. The voltage drop protector of claim 12,
wherein the voltage regulator includes a chopper, and
wherein the timer is installed in the voltage regulator.

16. The voltage drop protector of claim 12,
wherein tolerable error thresholds for a voltage and frequency required for the electrical device are the same as tolerable error thresholds for voltage and frequency required for the commercial power source, and the voltage drop protector serves to supply power to the electrical device from the lithium battery for about 1 second from a time point at which power supplied from the commercial power source is stopped or is lowered to a reference voltage or lower.

* * * * *